(12) United States Patent
Nakayama

(10) Patent No.: US 11,292,122 B2
(45) Date of Patent: Apr. 5, 2022

(54) ROBOT OPERATION APPARATUS

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 393 days.

(21) Appl. No.: 16/653,330

(22) Filed: Oct. 15, 2019

(65) Prior Publication Data

US 2020/0171649 A1 Jun. 4, 2020

(30) Foreign Application Priority Data

Nov. 29, 2018 (JP) .............................. JP2018-223868

(51) Int. Cl.
*G06F 17/00* (2019.01)
*B25J 9/00* (2006.01)
*B25J 19/00* (2006.01)

(52) U.S. Cl.
CPC ......... *B25J 9/0081* (2013.01); *B25J 19/0004* (2013.01)

(58) Field of Classification Search
CPC ....... B25J 9/0081; B25J 19/0004; B25J 13/00
USPC ........................................................ 700/245
See application file for complete search history.

(56) References Cited

U.S. PATENT DOCUMENTS

| | | | |
|---|---|---|---|
| 6,131,299 A | 10/2000 | Raab et al. | |
| 6,212,443 B1 * | 4/2001 | Nagata ................. | G05B 19/423 700/245 |
| 7,829,812 B2 * | 11/2010 | Tolbert ................. | H01H 13/702 200/600 |
| 8,022,933 B2 * | 9/2011 | Hardacker ....... | H04N 21/42204 345/169 |
| 8,547,333 B2 * | 10/2013 | Pasquero ............ | G06F 3/03547 345/161 |
| 8,674,961 B2 * | 3/2014 | Posamentier ........... | G06F 3/016 345/174 |
| 8,735,755 B2 * | 5/2014 | Peterson ................ | H03K 17/98 200/600 |
| 8,761,846 B2 * | 6/2014 | Caine .................... | G06F 1/1616 455/575.1 |

(Continued)

FOREIGN PATENT DOCUMENTS

| | | |
|---|---|---|
| CA | 2276991 A1 | 1/2000 |
| DE | 102017202717 A1 | 8/2017 |

(Continued)

OTHER PUBLICATIONS

Office Action dated Feb. 9, 2021 in corresponding Japanese Application No. 2018-223868; 7 pages including English-language translation.

*Primary Examiner* — Ronnie M Mancho
(74) *Attorney, Agent, or Firm* — Maier & Maier, PLLC

(57) ABSTRACT

A collaborative robot operation apparatus includes an operation unit that is operated by an operator in direct teaching of a robot including a cylindrical outer surface at least in a part, a communication unit that communicates operation information to the operation unit, to a control apparatus of the robot, and an attachment portion that detachably attaches the operation unit on the outer surface of the robot. The operation unit includes a rotation stopping portion between the outer surface of the robot and the operation unit.

13 Claims, 8 Drawing Sheets

(56) References Cited

U.S. PATENT DOCUMENTS

| | | | | |
|---|---|---|---|---|
| 8,912,458 B2* | 12/2014 | Peterson | ............ | H03K 17/9622 |
| | | | | 200/344 |
| 9,040,851 B2* | 5/2015 | Krumpelman | ......... | H01H 13/85 |
| | | | | 200/5 A |
| 9,182,837 B2* | 11/2015 | Day | ........................ | G06F 3/038 |
| 9,302,397 B2* | 4/2016 | Kimoto | .............. | G05B 23/0289 |
| 9,489,049 B2* | 11/2016 | Li | ........................ | G06F 3/03545 |
| 9,681,922 B2* | 6/2017 | Unsworth | .............. | A61B 34/37 |
| 9,827,678 B1* | 11/2017 | Gilbertson | ............. | B25J 18/025 |
| 9,984,838 B2* | 5/2018 | Huang | .................... | G06F 1/169 |
| 10,219,867 B2* | 3/2019 | Saglam | .................. | A61B 34/76 |
| 10,485,617 B2* | 11/2019 | Crawford | ................. | B25J 9/1065 |
| 10,888,386 B2* | 1/2021 | Eyre | ....................... | A61G 13/10 |
| 2005/0017947 A1* | 1/2005 | Shahoian | .............. | G06F 3/0338 |
| | | | | 345/156 |
| 2005/0187657 A1 | 8/2005 | Hashimoto et al. | | |
| 2009/0055019 A1 | 2/2009 | Stiehl et al. | | |
| 2011/0166491 A1 | 7/2011 | Sankai | | |
| 2014/0358279 A1* | 12/2014 | Kimoto | ................ | B25J 19/0025 |
| | | | | 700/245 |
| 2017/0249561 A1 | 8/2017 | Abdallah | | |
| 2018/0250823 A1* | 9/2018 | Shimodaira | ............ | B25J 9/1697 |

FOREIGN PATENT DOCUMENTS

| | | |
|---|---|---|
| EP | 1 566 246 A1 | 8/2005 |
| EP | 2 335 570 A1 | 6/2011 |
| GB | 2339023 A | 1/2000 |
| JP | S60163108 A | 8/1985 |
| JP | H11-277470 A | 10/1999 |
| JP | 2000035305 A | 2/2000 |
| JP | 2000165968 A | 6/2000 |
| JP | 2000171490 A | 6/2000 |
| JP | 2000181378 A | 6/2000 |
| JP | 2005-231010 A | 9/2005 |
| JP | 2007-089634 A | 4/2007 |
| JP | 2010010116 A | 1/2010 |
| JP | 3188939 U | 2/2014 |
| JP | 2015182142 A | 10/2015 |
| WO | 2010/029966 A1 | 3/2010 |

* cited by examiner

ROBOT OPERATION APPARATUS

CROSS-REFERENCE TO RELATED APPLICATIONS

This application claims the benefit of Japanese Patent Application No. 2018-223868, the content of which is incorporated herein by reference.

FIELD

The present invention relates to a robot operation apparatus.

BACKGROUND

A robot in which a touch panel monitor for direct teaching is detachably attached to an arm has been well-known (for example, see Japanese Unexamined Patent Application, Publication No. 2015-182142).

In this robot, the touch panel monitor is attached near the arm to which an operator applies force in the direct teaching to enable the direct teaching to be performed near the robot. If the touch panel monitor is difficult to view due to an attitude of the arm, the touch panel monitor is detached from the arm and is used.

SUMMARY

A robot operation apparatus according to an aspect of the present invention includes an operation unit that is operated by an operator in direct teaching of a robot including a cylindrical outer surface at least in a part, a communication unit that communicates operation information to the operation unit, to a control apparatus of the robot, and an attachment portion that detachably attaches the operation unit to the outer surface of the robot. The operation unit includes a rotation stopping portion between the outer surface of the robot and the operation unit.

DETAILED DESCRIPTION

A robot operation apparatus 1 according to an embodiment of the present invention is described below with reference to drawings.

Figure 1:
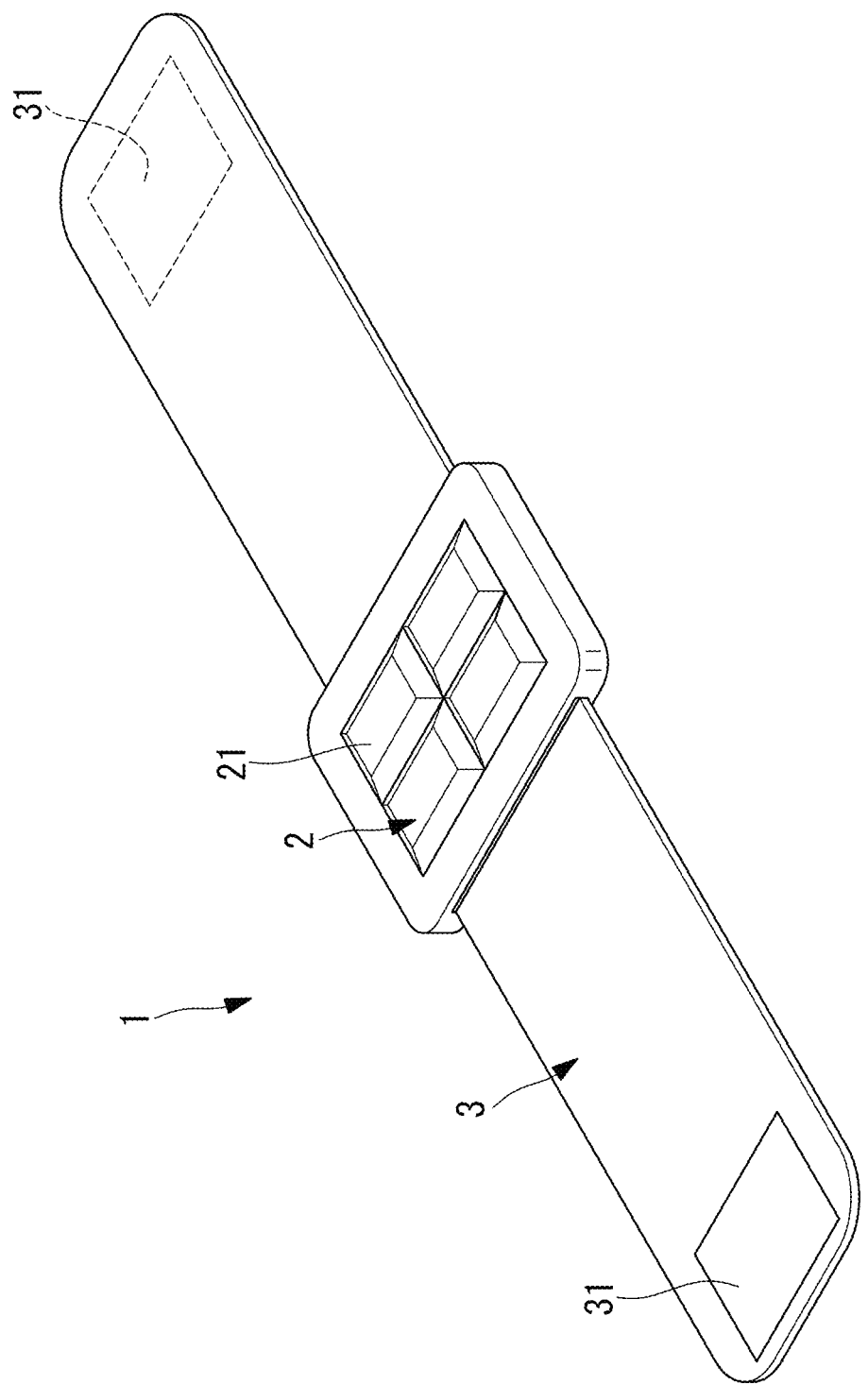
FIG. 1 is a perspective view illustrating a robot operation apparatus according to an embodiment of the present invention.

As illustrated in FIG. 1, the robot operation apparatus 1 according to the present embodiment includes a plate-like operation unit 2 and an attachment means 3 to attach the operation unit 2 on an outer surface of a collaborative robot (robot) 100. The operation unit 2 includes a plurality of buttons 21 that are operated by an operator in direct teaching of the collaborative robot 100, and an unillustrated communication unit that communicates operation information assigned to the buttons 21, to outside.

Examples of the buttons 21 of the operation unit 2 include a button to enable direct teaching when pressed, a button to store a coordinate of a teaching point, and a button to teach operation of a tool attached to a front end of the robot. The number of buttons 21 and the operation information assigned to the buttons 21 are optional. Further, for example, shapes or colors of the buttons 21 may be changed depending on intended use of the buttons 21 to improve operability of the operator.

The communication unit may communicate the operation information by a wireless communication system or a wired communication system.

In the case of the wired communication system, a communication cable is previously inserted into an arm 110 of the robot 100. A part of a dust-proof and drip-proof cover of the arm 110 may be detached, and the communication cable can be drawn out to be connected to the operation unit 2. The dust-proof and drip-proof cover may detached, and a relay connector appears and can be connected to a relay connector drawn out from the communication unit. Alternatively, a control apparatus and the operation unit 2 may be directly connected by the communication cable laid outside the arm 110 of the robot 100.

The attachment means 3 is, for example, a flexible belt. As illustrated in FIG. 1, the attachment means 3 extends to both sides of the operation unit 2, and includes fixing means 31 such as hook-and-loop fasteners on respective ends.

Figure 2:
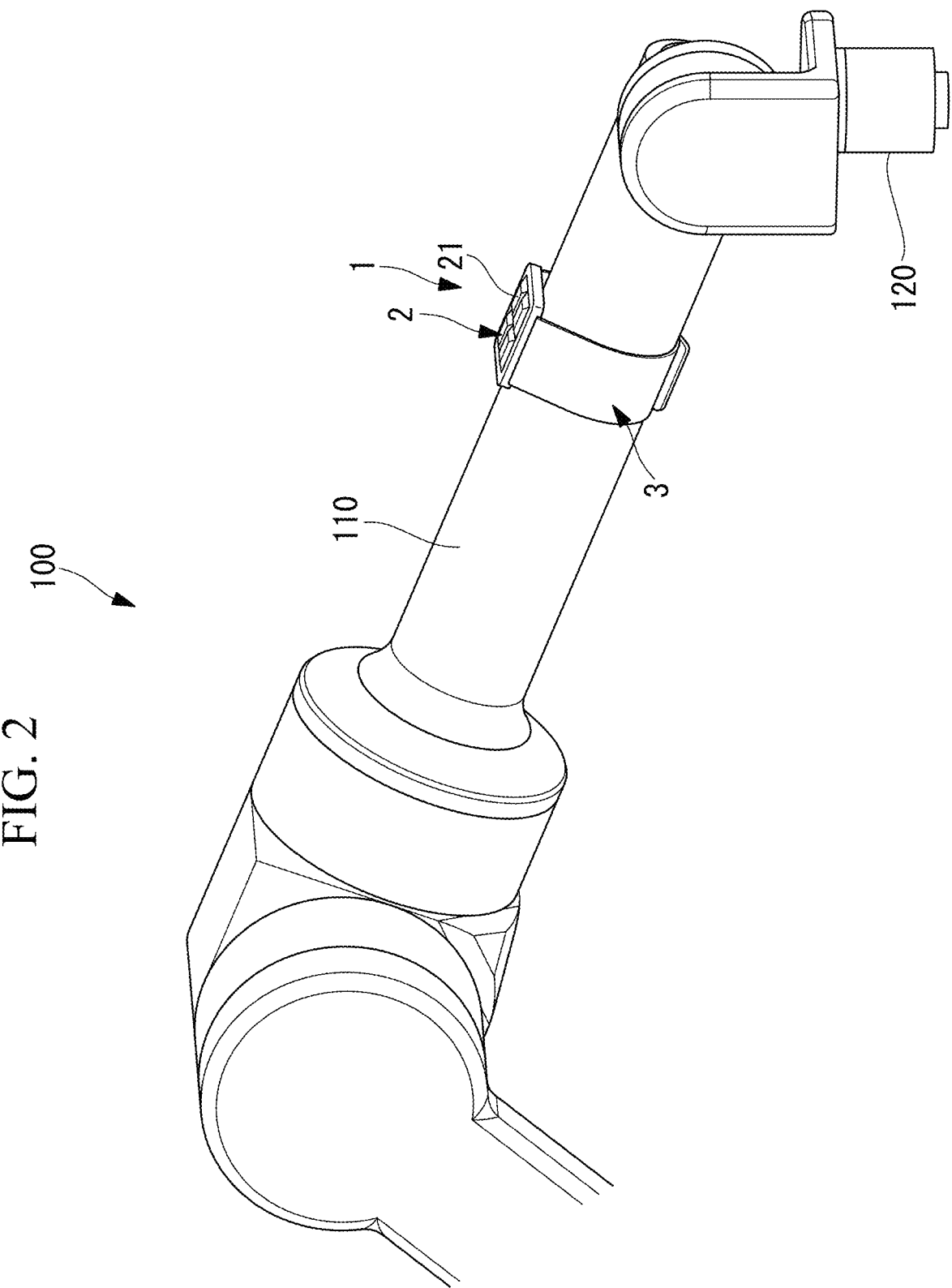
FIG. 2 is a perspective view illustrating a state where the robot operation apparatus of FIG. 1 is attached to an arm.

As illustrated in FIG. 2, the operation unit 2 is disposed on the outer surface of the arm 110 of the collaborative robot 100, and the belt as the attachment means 3 is wound around the arm 110 and is fixed by the hook-and-loop fasteners as the fixing means 31. This makes it possible to detachably attach the operation unit 2 at an optional position of the arm 110.

The fixing means 31 may be of a type in which a buckle pin provided at one end of the belt 3 is inserted into and fixed to any of holes provided with intervals in a length direction at the other end of the belt 3 or any other optional type, in place of the hook-and-loop fasteners. A winding perimeter of the belt 3 can be continuously adjusted by the hook-and loop fasteners and be stepwisely adjusted by the buckle.

Figure 4:
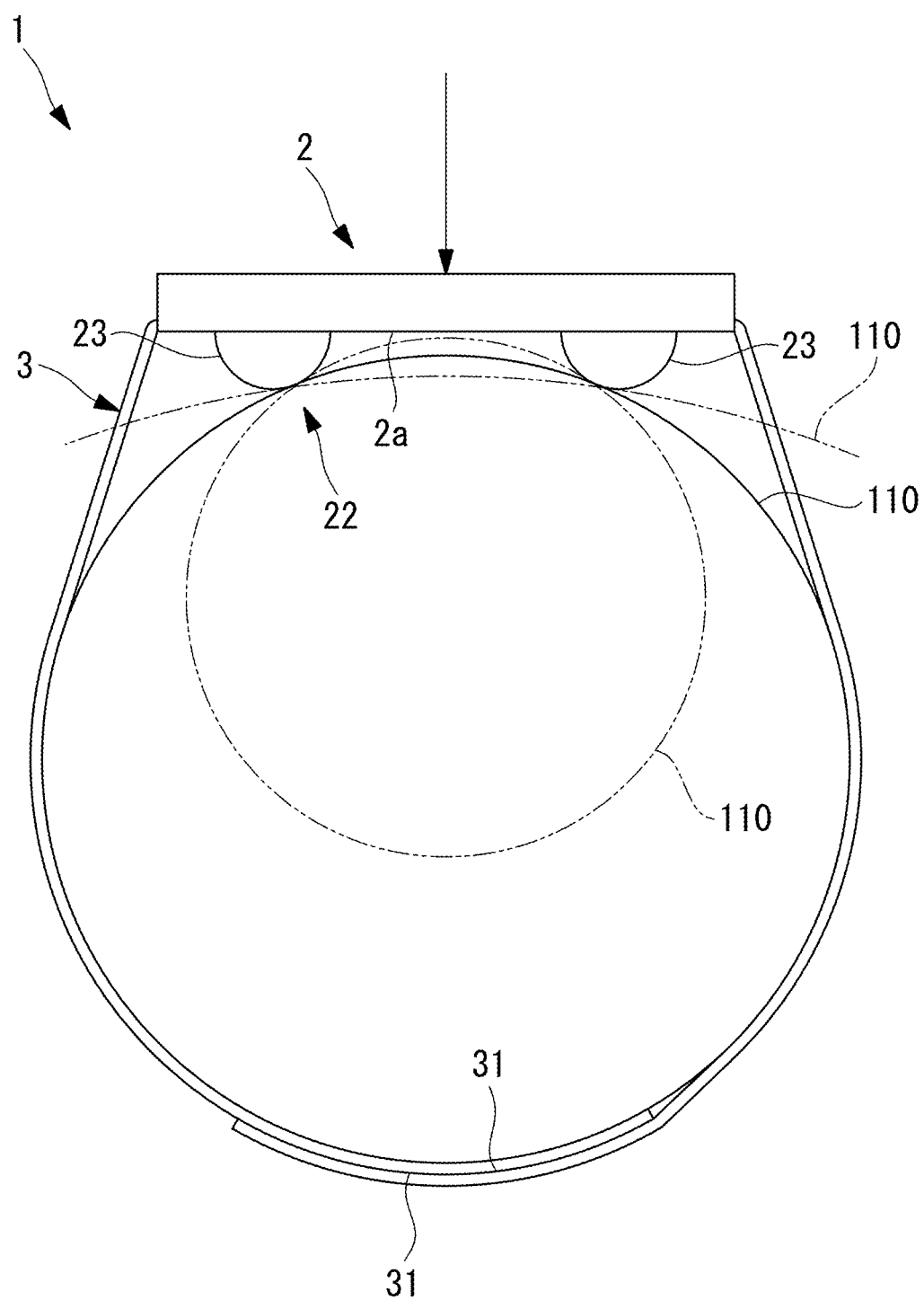
FIG. 4 is a diagram illustrating the robot operation apparatus of FIG. 2 as viewed from a longitudinal axis direction of the arm.
Figure 5:
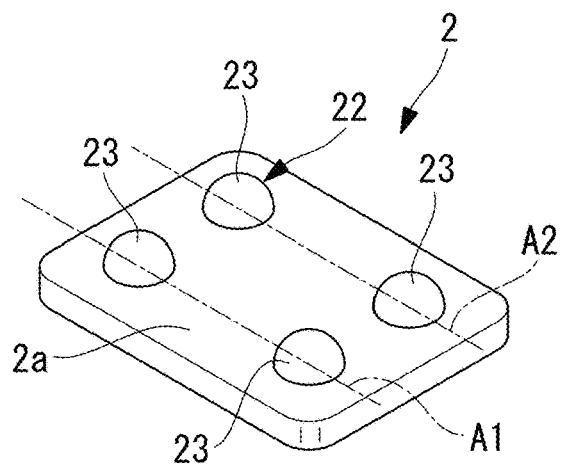
FIG. 5 is a perspective view illustrating a rear surface of an operation unit of the robot operation apparatus of FIG. 1.

In the collaborative robot operation apparatus 1 according to the present embodiment, a contact portion (support portion) 22 illustrated in FIG. 4 and FIG. 5 is provided on a rear surface 2a of the operation unit 2. For example, as illustrated in FIG. 5, the contact portion 22 includes four protrusions (point contact portions) 23 that are disposed with intervals in both of a width direction and a length direction of the operation unit 2. Each of the protrusions 23 is formed in a hemispherical shape having the same radius.

More specifically, these protrusions 23 are disposed two by two on two straight lines A1 and A2, with an interval in a length direction of the two straight lines A1 and A2. The two straight lines A1 and A2 are disposed in parallel with an interval in a width direction.

Further, the operation unit 2 includes a rubber (nonslip portion or rotation stopping means, not illustrated) covering a surface of the contact portion 22.

Operation of the collaborative robot operation apparatus 1 having the above-described configuration according to the present embodiment is described below.

To perform the direct teaching of the collaborative robot 100 with use of the collaborative robot operation apparatus 1 according to the present embodiment, the collaborative robot operation apparatus 1 illustrated in FIG. 1 is attached to the arm 110 of the collaborative robot 100, for example, as illustrated in FIG. 2.

At this time, the belt 3 provided on the operation unit 2 is wound around the arm 110 in a circumferential direction while the rear surface 2a of the operation unit 2 is in contact with the outer surface of the arm 110. Further, the loop-and-hook fasteners as the fixing means 31 provided at both ends of the belt 3 are engaged to attach the operation unit 2 while the four protrusions 23 provided on the rear surface 2a of the operation unit 2 are simultaneously in close contact with the outer surface of the arm 110.

Securing the sufficiently wide fixing means 31 allows for attachment of the operation unit 2 even when a thickness of the arm 110 to which the operation unit 2 is attached is changed.

Since the four protrusions 23 are disposed two by two on the straight lines A1 and A2 that are disposed in parallel with an interval, the straight lines A1 and A2 are disposed in parallel to a longitudinal axis of the arm 110, which makes it possible to simultaneously bring the protrusions 23 into contact with the outer surface of the cylindrical arm 110. In other words, it is possible to simultaneously bring the four protrusions 23 into contact with the outer surface of the cylindrical arm 110 as illustrated by an alternate long and two short dashes line in FIG. 4 even if a curvature of the arm 110 is different.

Accordingly, as illustrated by an arrow in FIG. 4, even when pressure is applied to the operation unit 2 at an optional position between the protrusions 23, the operation unit 2 is supported by the two protrusions 23 on both sides of a force point of pressing force. This allows for stable operation of the operation unit 2 without backlash of the operation unit 2 in the circumferential direction of the arm 110. This is true of the longitudinal direction of the arm 110.

Further, in the present embodiment, each of the protrusions 23 is formed in a spherical shape. Therefore, a contact point of each of the protrusions 23 is adapted to all of the outer surfaces of the arm 110 different in curvature, which makes it possible to bring each of the protrusions 23 into point contact with the outer surface of the arm 110 in a normal direction. As a result, it is possible to more stably support the operation unit 2, and to perform more stable operation.

Further, since the surfaces of the protrusions 23 of the contact portion 22 are covered with the rubber as the nonslip portion, friction between the outer surface of the robot 100 and the operation unit 2 is increased to stabilize the operation unit 2 in both of the longitudinal direction and the circumferential direction of the arm 110.

When the operator presses the button 21 to enable the direct teaching, provided on the operation unit 2 while the collaborative robot operation apparatus 1 is attached to the arm 110 of the collaborative robot 100, a start signal of the direct teaching is transmitted to the control apparatus by the communication unit, and the direct teaching is then started.

The operator applies force to the arm 110 of the collaborative robot 100 by both hands to move the collaborative robot 100 while the operator presses the button 21 to enable the direct teaching. Further, when the operator presses the button 21 for teaching at a desired position, a coordinate of the collaborative robot 100 at that time is recorded as a coordinate of a teaching point. Further, when the operator presses the button 21 to instruct operation of a tool as necessary, a control signal of the tool is transmitted to and stored in the control apparatus. The direct teaching can be performed in the above-described manner.

In this case, the collaborative robot operation apparatus according to the present embodiment is applicable irrespective of the curvature of the arm 110 to which the collaborative robot operation apparatus 1 is attached. Therefore, it is possible to attach the collaborative robot operation apparatus 1 at a position that is most appropriate for the operator to apply force to the arm 110 while the operator presses the button 21 to enable the direct teaching. Further, even when the collaborative robot operation apparatus 1 is attached at the optional position, the operation unit 2 can be stably fixed to the arm 110 and can be easily operated.

The attachment position of the operation unit 2 is freely selectable because an attachment structure is not provided on the arm 110. This eliminates necessity of providing the operation unit 2 at a position where the operation unit 2 is difficult to operate depending on an attitude of the collaborative robot 100, and it is possible to provide the operation unit 2 at the optional position where the operation unit 2 is easily operated during the direct teaching. Further, the attachment position can be changed and the operation can be performed every time the operation unit 2 is unavoidably fixed at the position where the operation unit 2 is difficult to be operated.

Figure 3:
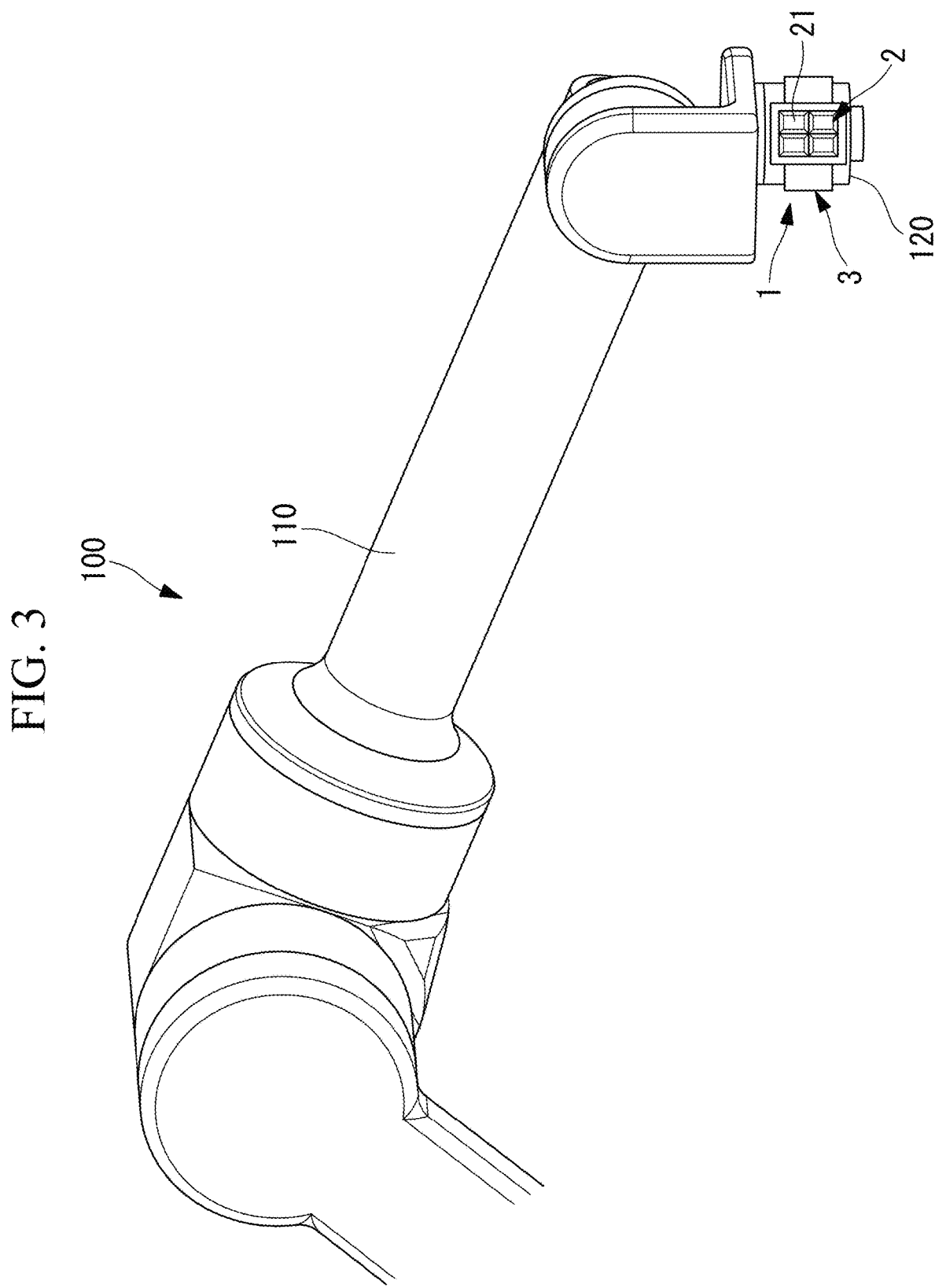
FIG. 3 is a perspective view illustrating a state where the robot operation apparatus of FIG. 1 is attached to a wrist.

Further, in the present embodiment, the four protrusions 23 can be simultaneously brought into contact with the outer surface of the arm 110 even when the curvature of the outer surface of the arm 110 to which the operation unit 2 is attached is different. Accordingly, even in a case where the belt 3 is wound around the arm 110 having a thick cylindrical shape as illustrated in FIG. 2 or even in a case where the belt 3 is wound around a front end of a wrist 120 that is thinner than the arm 110 as illustrated in FIG. 3, the operation unit 2 can be stably fixed.

Further, in the present embodiment, since the four protrusions 23 are each formed in a spherical shape, it is possible to adapt the contact points of the protrusions 23 not only to the outer surface of the cylindrical shape but also to the outer surface of a spherical surface shape, and to simultaneously bring the protrusions 23 into point contact with the outer surface.

Figure 6:
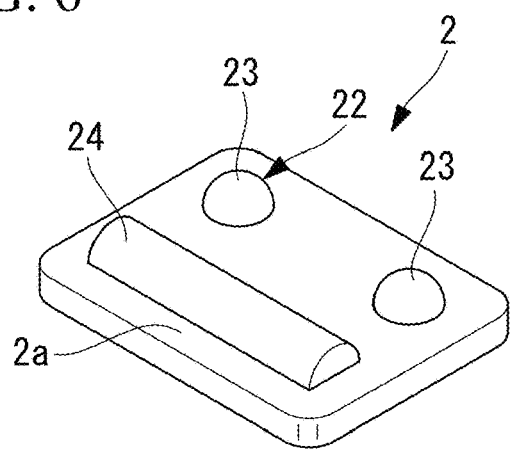
FIG. 6 is a perspective view illustrating a modification of a protrusion provided on the operation unit of FIG. 5.

Although the case where the four protrusions 23 are brought into point contact with the outer surface of the collaborative robot 100 has been described in the present embodiment, the shape of each of the protrusions 23 may not be a spherical shape. Further, in place of two protrusions 23 disposed in one of the straight lines, a columnar protrusion (linear contact portion) 24 extending in a direction along the straight line may be adopted as illustrated in FIG. 6. Further alternatively, the two protrusions 23 arranged on each of the two straight lines A1 and A2 may be replaced with the columnar protrusion 24 as illustrated in FIG. 7.

Figure 7:
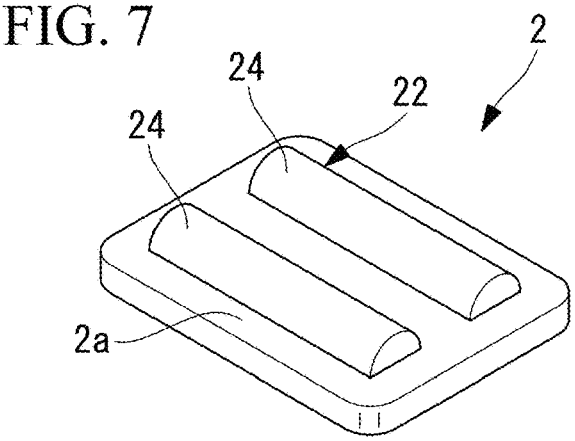
FIG. 7 is a perspective view illustrating another modification of the protrusion provided on the operation unit of FIG. 5.

Even when the spherical protrusions 23 are replaced with the columnar protrusion 24 as illustrated in FIG. 6 and FIG. 7, relationship illustrated in FIG. 4 is established as is, and the operation unit 2 is advantageously stably fixable.

Figure 8:
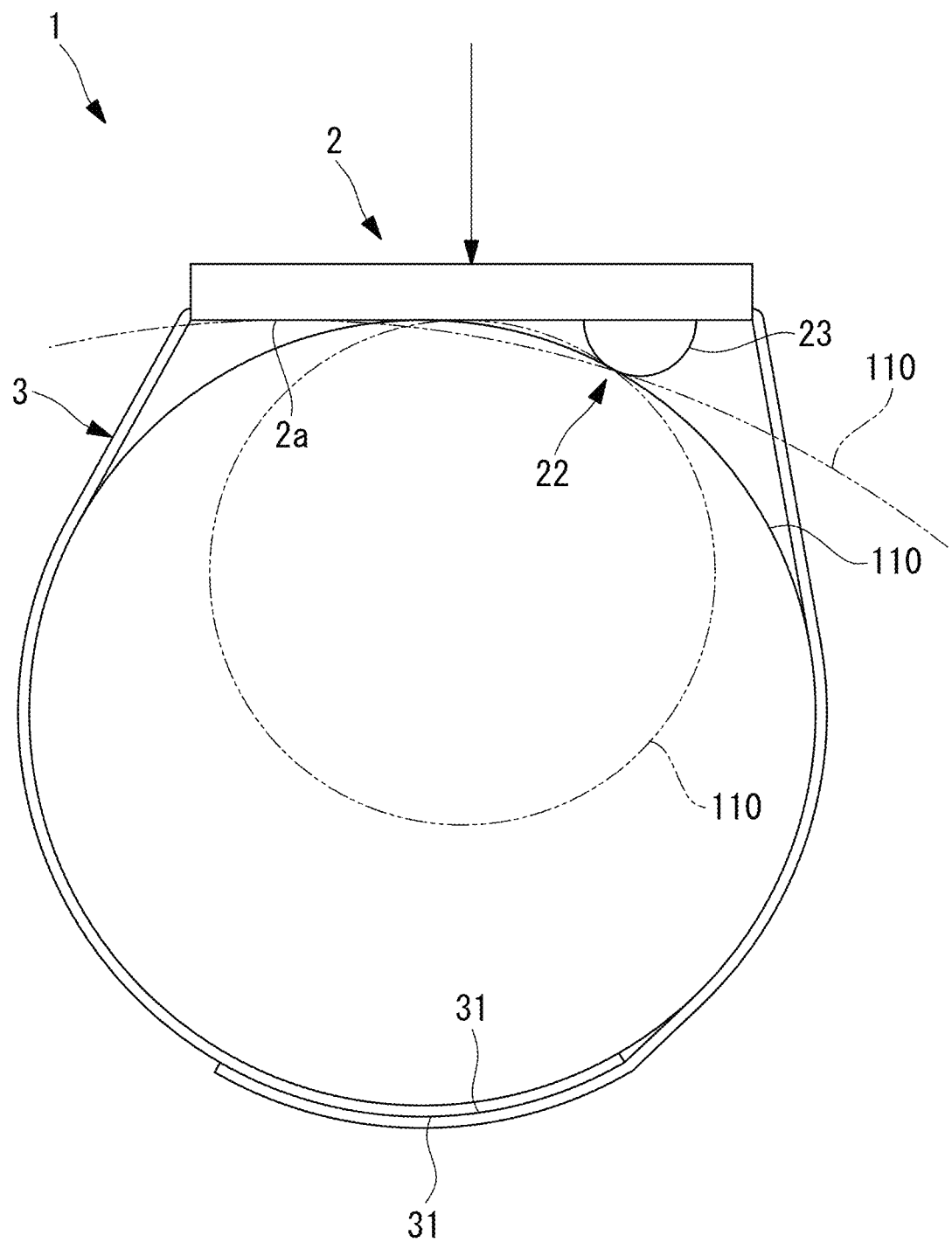
FIG. 8 is a diagram illustrating a modification of the robot operation apparatus of FIG. 4 as viewed from the longitudinal axis direction of the arm.

Further, in place of line contact by the columnar protrusion 24, the planar rear surface (linear contact portion) 2a of the plate-like operation unit 2 may be brought into line contact with the outer surface of the arm 110 as illustrated in FIG. 8.

Figure 9:
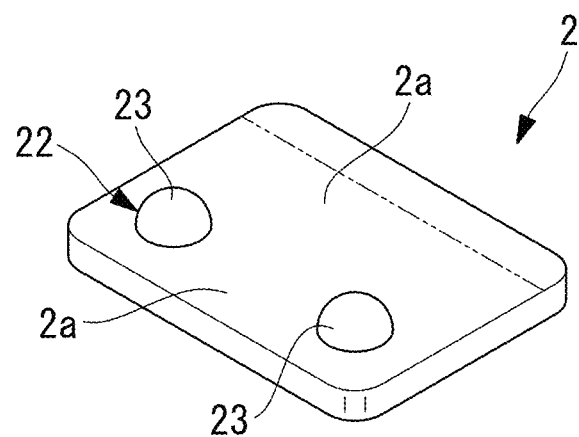
FIG. 9 is a perspective view illustrating a rear surface of an operation unit of the robot operation apparatus of FIG. 8.
Figure 10:
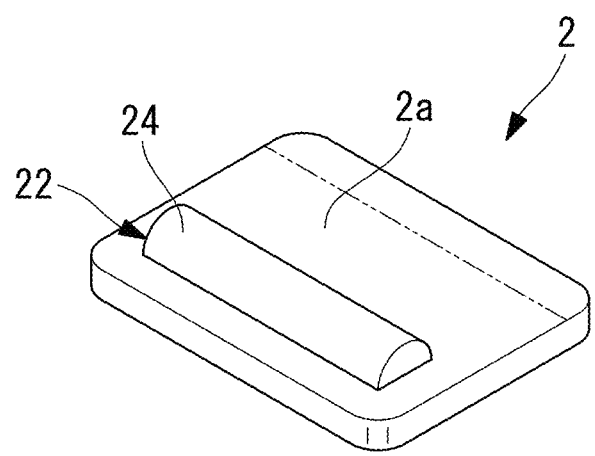
FIG. 10 is a perspective view illustrating a modification of a protrusion provided on the operation unit of FIG. 9.

In other words, the columnar protrusion 24 in FIG. 6 may be removed to cause line contact at a position of the rear surface 2a illustrated by an alternate long and two short dashes line as illustrated in FIG. 9, or one of the columnar protrusions 24 in FIG. 7 may be removed to cause line contact at a position of the rear surface 2a illustrated by an alternate long and two short dashes line as illustrated in FIG. 10.

Also in this case, as illustrated in FIG. 8, it is possible to bring the surface of the arm 110 into line contact with the rear surface 2a of the operation unit 2 and to stably fix the operation unit 2 even when the curvature of the arm 110 to which the operation unit 2 is attached is different.

The case where the four protrusions 23 that are disposed two by two with an interval on the parallel straight lines are simultaneously brought into contact with the outer surface of the collaborative robot 100 at the four contact points has been described above. Alternatively, three or more contact points may be provided as long as the contact points are disposed in the same straight line.

Further, the case where the plurality of buttons 21 are disposed on the operation unit 2 has been described in the present embodiment; however, operation buttons and the other information may be displayed on a touch panel monitor. Further, a display apparatus that is not a touch panel may be provided on the operation unit 2.

Further, in addition to the case where the belt 3 is wound around the optional outer surface of the collaborative robot 100, the belt 3 may be wound around the operator's own arm when in use.

Although the rectangular plate-like operation unit 2 has been described above, the operation unit 2 may have a disc shape or any other optional shape. Further, the operation unit 2 itself may have a bendable shape, and the bendable operation unit 2 may be bent based on the curvature of the surface of the collaborative robot 100 to cause surface contact between the rear surface 2a of the operation unit 2 and the outer surface of the collaborative robot 100.

The case where the rear surface 2a of the operation unit 2 or the protrusions 23 provided on the rear surface 2a of the operation unit 2 are brought into direct contact with the outer surface of the collaborative robot 100 has been described above. Alternatively, the rear surface 2a of the operation unit 2 or the protrusions 23 provided on the rear surface 2a of the operation unit 2 may be brought into indirect contact with the outer surface of the collaborative robot 100 through the belt 3 or any other members.

The robot operation apparatus 1 to be attached to the outer surface of the collaborative robot 100 has been described above; however, the attachment target is not limited to the collaborative robot 100, and the robot operation apparatus 1 may be used for a robot of the other type.

In the present embodiment, the nonslip portion covering the contact portion 22 has been described. Alternatively, the nonslip portion to be attached to the contact portion 22 may be adopted.

Further, the rubber has been described as the nonslip portion; however, the other member may be adopted as long as the member can increase friction. Further, as the nonslip portion, it may be that obtained by processing at least a part of the surface of the contact portion 22 to increase the friction.

In this case, the nonslip portion that prevents rotation of the collaborative robot operation apparatus 1 even when the operator presses any of the buttons 21 provided on the operation unit 2, namely, the nonslip portion that has friction force larger than slipping rotation force along the outer surface of the arm 110 in the longitudinal direction and the circumferential direction of the arm 110 applied when any of the buttons 21 is pressed, is preferably adopted.

Figure 11:
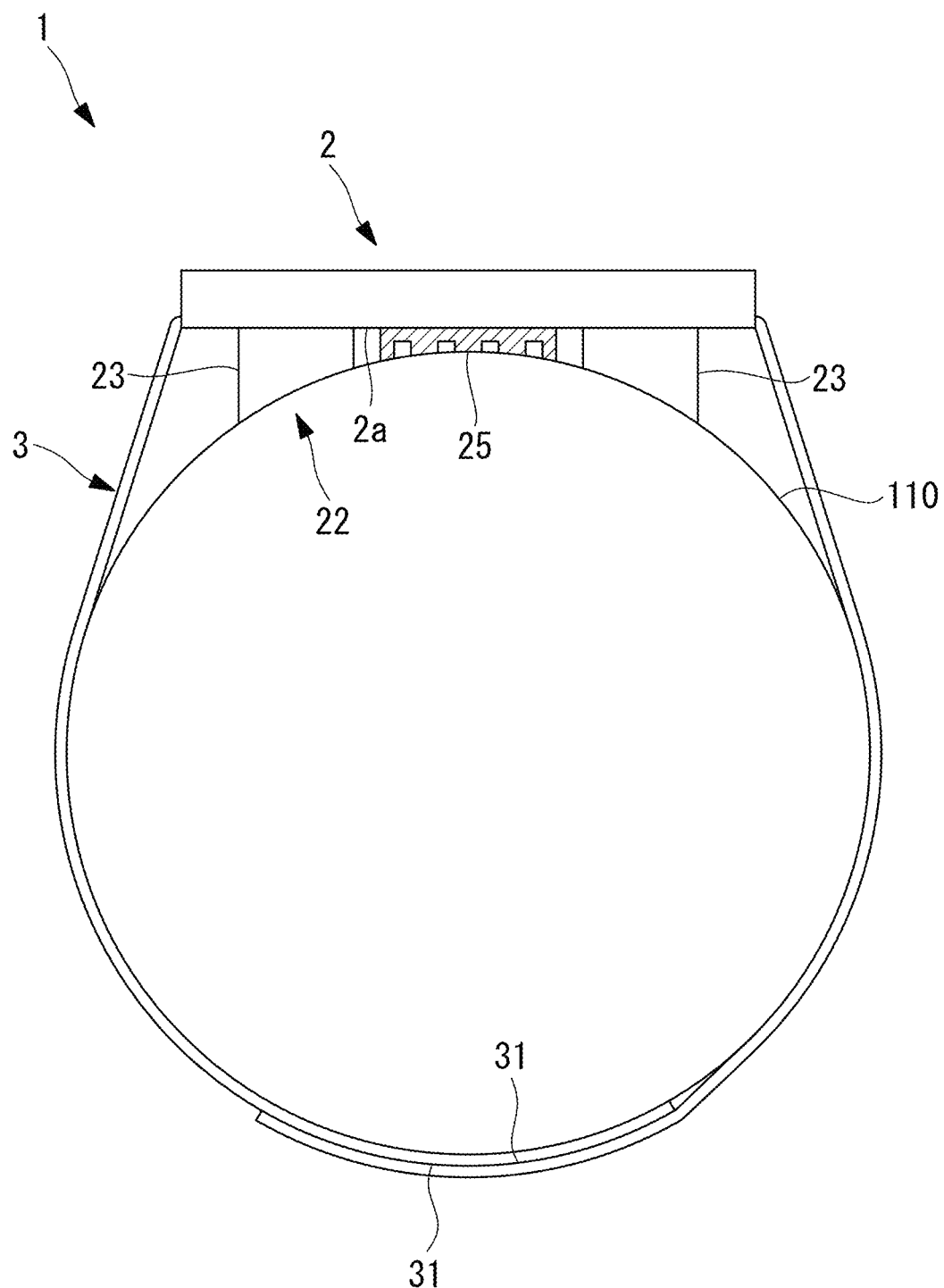
FIG. 11 is a diagram illustrating another modification of the robot operation apparatus of FIG. 4 as viewed from the longitudinal axis direction of the arm.

Further, although the case where the rubber (nonslip portion) covering the surface of the support portion including the four protrusions 23 is brought into point contact with the outer surface of the collaborative robot 100 has been described in the present embodiment, the rubber may be brought into surface contact with the outer surface of the collaborative robot 100 as illustrated in FIG. 11.

In this case, the protrusions 23, the surfaces of which have been processed so as to match with the outer surface of the arm 110 of the collaborative robot 100, may be adopted, or the protrusions 23 that are made of an elastic material and are brought into surface contact with the arm 110 by being elastically deformed when the belt 3 is wound around the arm 110 may be adopted. A nonslip portion 25 is provided on the rear surface 2a of the operation unit 2 and between the protrusions 23, and is increased in friction through uneven processing on a surface thereof.

From the above-described embodiment, the following invention is derived.

A robot operation apparatus according to an aspect of the present invention includes an operation unit that is operated by an operator in direct teaching of a robot including a cylindrical outer surface at least in a part, a communication unit that communicates operation information to the operation unit, to a control apparatus of the robot, and an attachment means that detachably attaches the operation unit to the outer surface of the robot. The operation unit includes a rotation stopping means between the outer surface of the robot and the operation unit.

According to the present aspect, when the operation unit is attached to the optional outer surface of the robot by the attachment means, the operation unit can be stabilized in both of a longitudinal direction and a circumferential direction of the arm by the rotation stopping means provided on the operation unit. This is particularly effective in the collaborative robot because an outer periphery of the arm of the collaborative robot desirably has a cylindrical shape in order to minimize contact force with the collaborative operator, and further, direct teaching is frequently performed in the collaborative robot.

In the direct teaching, it is necessary for the operator to directly hold and guide the robot arm by a hand as well as to continuously press a button of the operation unit by a finger of the guiding hand at the same time. Therefore, immovable stability when the operator presses the button of the operation unit to apply a biased load is important.

Therefore, it is possible to stably attach the operation unit to the optional outer surface of the robot. In addition, it is possible to prevent occurrence of backlash of the operation unit even when force is applied to the operation unit in operation, thereby facilitating operation. Further, according to the method in which rotation between the operation unit and the outer surface of the robot is stopped by the rotation stopping means, it is possible to stably attach the operation unit to the cylindrical outer surface of the robot different in curvature, and to select a position with high operability.

When the operation unit is operated by the operator in the direct teaching of the robot, the operation information is communicated to the control apparatus of the robot by the communication unit, and a teaching program is created in the control apparatus. Since the direct teaching is performed while the operation unit is attached to the cylindrical outer surface of the robot, the operator can perform the direct teaching while operating the robot with both hands.

In the above-described aspect, the rotation stopping means may be a nonslip portion that increases friction between the outer surface and the operation unit when the operation unit is attached to the outer surface by the attachment means.

With this configuration, the nonslip portion provided on the operation unit is brought into contact with the cylindrical outer surface of the robot. In other words, the nonslip portion is brought into contact with the cylindrical outer surface of the arm or the like of the robot to increase friction between the outer surface of the robot and the operation unit. This makes it possible to stabilize the operation unit in both of a longitudinal direction and a circumferential direction of the arm.

Further, in the above-described aspect, the operation unit may include a support portion that comes into contact with the outer surface of the robot simultaneously at three or more contact points, and the nonslip portion may be provided on the support portion.

Further, in the above-described aspect, the support portion may include four or more point contact portions.

With this configuration, the four or more point contact portions provided on the operation unit are simultaneously brought into contact with the cylindrical outer surface of the robot. As a result, it is possible to stably attach the operation unit to the outer surface of the robot, and to stably attach the operation unit also to the cylindrical outer surface of the robot different in curvature.

Further, in the above-described aspect, the support portion may include a linear contact portion extending along one of two parallel straight lines and two or more point contact portions disposed on the other straight line.

With this configuration, the one linear contact portion and the two or more point contact portions provided on the operation unit are simultaneously brought into contact with the cylindrical outer surface of the robot. As a result, it is possible to stably attach the operation unit to the outer surface of the robot, and to stably attach the operation unit also to the cylindrical outer surface of the robot different in curvature.

Further, in the above-described aspect, each of the point contact portions may be a spherical protrusion provided on a rear surface of the operation unit.

With this configuration, the spherical protrusions are easily brought into contact with the cylindrical outer surface of the robot different in curvature, which allows for stable attachment of the operation unit. The spherical protrusions may be made of a hard metal, a resin, or an elastic body such as a rubber.

Further, in the above-described aspect, the linear contact portion may be a rear surface of the operation unit.

With this configuration, it is possible to cause line contact between the operation unit and the cylindrical outer surface of the robot only by bringing the rear surface of the plate-like operation unit into contact with the cylindrical outer surface of the robot.

Further, in the above-described aspect, the linear contact portion may be a columnar protrusion provided on a rear surface of the operation unit.

With this configuration, it is possible to cause line contact between the protrusion and the cylindrical outer surface of the robot by providing the columnar protrusion on the rear surface of the operation unit in the length direction of the cylindrical outer surface of the robot.

Further, in the above-described aspect, the support portion may include two linear contact portions extending along respective two straight lines.

With this configuration, the two linear contact portions are disposed in the length direction of the cylindrical outer surface of the robot at the positions with an interval in the circumferential direction of the outer surface, which makes it possible to cause simultaneous line contact of the linear contact portions.

Further, in the above-described aspect, one of the linear contact portions may be a rear surface of the operation unit.

With this configuration, it is possible to cause line contact between the operation unit and the outer surface of the robot only by bringing the rear surface of the operation unit as one of the linear contact portions into contact with the cylindrical outer surface of the robot.

Further, in the above-described aspect, at least one of the linear contact portions may be a columnar protrusion provided on a rear surface of the operation unit.

With this configuration, it is possible to cause line contact between the protrusion and the outer surface of the robot by providing the columnar protrusion on the rear surface of the operation unit in the length direction of the cylindrical outer surface of the robot.

In the above-described aspect, the attachment means may be a belt that is wound around and fixed to an arm of the robot.

With this configuration, it is possible to wind the belt provided on the operation unit around the arm and to easily detachably attach the operation unit without providing special attachment structure on the arm of the robot.

Further, in the above-described aspect, the attachment means may be adjustable in winding perimeter.

With this configuration, it is possible to adjust the winding perimeter of the belt and to detachably attach the operation unit at an optional position of the arm different in perimeter.

The invention claimed is:

1. A robot operation apparatus, comprising:
   an operation unit that is operated by an operator in direct teaching of a robot, including at least in part, a cylindrical outer surface;
   a communication unit that communicates operation information to the operation unit to a control apparatus of the robot; and
   an attachment portion that detachably attaches the operation unit to the outer surface of the robot, wherein
   the operation unit includes a rotation stopping portion between the outer surface of the robot and the operation unit.

2. The robot operation apparatus according to claim 1, wherein the rotation stopping portion is a nonslip portion that increases friction between the outer surface and the operation unit when the operation unit is attached to the outer surface by the attachment portion.

3. The robot operation apparatus according to claim 2, wherein the operation unit includes a support portion that comes into contact with the outer surface of the robot simultaneously at three or more contact points, and the nonslip portion is provided on the support portion.

4. The robot operation apparatus according to claim 3, wherein the support portion includes four or more point contact portions.

5. The robot operation apparatus according to claim 3, wherein the support portion includes a linear contact portion extending along one of two parallel straight lines and two or more point contact portions disposed on the other straight line.

6. The robot operation apparatus according to claim 4, wherein each of the point contact portions is a spherical protrusion provided on a rear surface of the operation unit.

7. The robot operation apparatus according to claim 5, wherein the linear contact portion is a rear surface of the operation unit.

8. The robot operation apparatus according to claim 5, wherein the linear contact portion is a columnar protrusion provided on a rear surface of the operation unit.

9. The robot operation apparatus according to claim 3, wherein the support portion includes two linear contact portions extending along respective two straight lines.

10. The robot operation apparatus according to claim 9, wherein one of the linear contact portions is a rear surface of the operation unit.

11. The robot operation apparatus according to claim 9 wherein at least one of the linear contact portions is a columnar protrusion provided on a rear surface of the operation unit.

12. The robot operation apparatus according to claim 1, wherein the attachment portion is a belt that is wound around and fixed to an arm of the robot.

13. The robot operation apparatus according to claim 12, wherein the attachment portion is adjustable via winding perimeter.

* * * * *